(12) United States Patent
Andersson et al.

(10) Patent No.: US 7,510,354 B2
(45) Date of Patent: Mar. 31, 2009

(54) TOOL AND A CUTTING INSERT FOR CHIP REMOVING MACHINING

(75) Inventors: Claes Andersson, Valbo (SE); Kjell Englund, Valbo (SE); Daniel Edler, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 200 days.

(21) Appl. No.: 11/785,075

(22) Filed: Apr. 13, 2007

(65) Prior Publication Data
US 2007/0248425 A1 Oct. 25, 2007

(30) Foreign Application Priority Data
Apr. 20, 2006 (SE) .................................. 0600876

(51) Int. Cl.
*B23C 5/00* (2006.01)
*B23C 1/00* (2006.01)

(52) U.S. Cl. .......................... 407/113; 407/66; 407/101

(58) Field of Classification Search ......... 407/113–116, 407/101, 103, 107, 30, 33, 66, 67
See application file for complete search history.

(56) References Cited

U.S. PATENT DOCUMENTS 4,315,706 A 2/1982 Erkfritz
5,775,855 A * 7/1998 Reiterman et al. ........... 407/42
5,810,518 A * 9/1998 Wiman et al. ............... 407/102
5,820,310 A * 10/1998 Boianjiu ..................... 407/66
5,888,029 A * 3/1999 Boianjiu ..................... 407/66
5,924,826 A * 7/1999 Bystrom et al. ............. 407/103
7,387,474 B2 * 6/2008 Edler et al. ................. 407/113

FOREIGN PATENT DOCUMENTS

| DE | 42 44 316 A1 | 6/1994 |
| DE | 198 47 227 A1 | 4/2000 |
| DE | 299 20 262 U1 | 4/2000 |
| EP | 0 300 172 | 5/1988 |
| EP | 0 730 926 A1 | 9/1996 |
| EP | 1 405 686 | 4/2004 |
| WO | WO 2004/092977 A1 | 9/2004 |

* cited by examiner

*Primary Examiner*—Willmon Fridie
(74) *Attorney, Agent, or Firm*—Drinker Biddle & Reath LLP

(57) ABSTRACT

The invention relates to a cutting tool including a basic body and a cutting insert detachably connected to the basic body via an interface, which includes a pair of co-operating connecting surfaces in which engagement means are included, which may be in the form of knobs and seatings. A knob and a co-operating seating have a rotationally symmetrical, conical shape to prevent translation of the cutting insert in the plane of the interface. Another knob ensures that the cutting insert cannot be rotated in relation to the conical knob. Simultaneously, ample bearing surfaces abut against co-operating support surfaces in a connecting surface. In such a way, the cutting insert is fixed in a stable, non-overdetermined position in the basic body. Furthermore, the invention relates to a cutting insert as such.

56 Claims, 10 Drawing Sheets

TOOL AND A CUTTING INSERT FOR CHIP REMOVING MACHINING

This application claims priority under 35 U.S.C. § 119 to Sweden Patent Application No. 0600876-7, filed on Apr. 20, 2006, the disclosure of which is incorporated by reference herein in its entirety.

FIELD OF THE INVENTION

The present invention relates generally to a tool for chip removing machining of the type that includes a basic body and a cutting insert, which is detachably connected to the basic body via an interface, which includes, on one hand, a first connecting surface included in the basic body and in which one or more female- and/or male-like, primary engagement means are formed, and, on the other hand, a second connecting surface included in the cutting insert and in which one or more secondary, male- and/or female-like engagement means are formed for the engagement with the primary engagement means in the first connecting surface, the connecting surfaces of the cutting insert and the basic body having a common geometrical reference locus, and the cutting insert including a corner having an active cutting edge. The present invention also relates to a cutting insert as such.

BACKGROUND OF THE INVENTION

Within the field of chip removing or cutting machining of blanks of metal, development continues with the purpose of making more effective not only the capacity of the tools to carry out the machining in a fast and accurate way, but also the manufacture of the different parts of the tools in the form of basic bodies (holders) and replaceable cutting inserts. A trend in development is to improve the machining results with respect to the precision and surface finish, requiring that the active cutting edge of the cutting insert obtains an exact, predetermined position in relation to the basic body. Another trend is to reduce the costs for the manufacture of the tools. This has, among other things, led to the cutting inserts being made from cemented carbide, which are most commonly occurring on the market, already in connection with the compression-moulding and sintering having obtained a better and better dimensional accuracy. In order to obtain good precision of the cutting inserts, previously it was necessary to subject the same to expensive grinding operations, but with the improved compression-moulding and sintering technique, it has become possible to use direct-pressed, i.e., unground, cutting inserts in more and more applications. Even so, the tool designer still has to take into account a dimensional variation of the order of ±0.5% of the nominal dimensions of the cutting insert. This means that the active edge of the cutting insert very well may end up in the desired position if the outcome of the insert production is good, but when the insert production is not good (so far that the cutting insert has swollen and become longer, or shrunk and become shorter, than intended), the position of the cutting edge in relation to the basic body may deviate to such a high extent from the desired position that the machining precision will be reduced.

Recently, tools have been developed, the interfaces between the basic body and the cutting insert of which are formed with connecting surfaces, which individually include male-like as well as female-like engagement means, and which engage each other. Originally, these connecting surfaces included so-called serration connecting surfaces, of the type that includes a plurality of parallel, male-like ridges and female-like grooves, the ridges of which in one of the connecting surfaces engage the grooves of the other connecting surface, and vice versa. In a next stage of development, the interfaces were refined by the fact that certain ridges were orientated at right or other angles to other ridges, often in combination with the number of ridges being reduced to a minimum. However, common to previously known interfaces, the male-like engagement means are more or less elongate, straight ridges having inclined flanks, which have the purpose of guaranteeing the positioning of the cutting insert as well as the transfer of force from the cutting insert to the basic body, by the fact that the flanks of the ridges should have good contact along the entire length thereof, at the same time as the ridges must not touch the bottom of the appurtenant grooves.

Within the field of chip removing machining, there is a difference between theory and practice. Thus, in theory, it is fairly simple to construct interfaces that have optimal properties in respect of stably fixing the cutting insert and the active cutting edge thereof in an exact predetermined position in relation to the basic body, and guaranteeing a good abutment of all the various forces that act on the cutting insert during operation. However, in practice, the stability and position of the cutting insert are affected by a number of unforeseeable factors, one of the most difficult to master being the varying outcome of the manufacture of the cutting inserts. As long as the outcome gives a good, nominal dimensional accuracy, the intended and calculated surface or line contact, among other things, is obtained between the flanks of the ridges and grooves along the entire length of the flanks, but as soon as even moderate form defects arise, there is a risk that the contact between the flanks is reduced to point contacts or partial line contact. This may in turn result in the cutting insert, initially as well as during operation, being positioned incorrectly in relation to the basic body (by so-called overdetermination), and that the transfer of force between the cutting insert and the basic body becomes inferior.

By European Patent No. 0300172 and U.S. Pat. No. 4,315,706, there are previously known cutting tools having cutting inserts, which are detachably connected to the appurtenant basic bodies via interfaces, which include cross section-wise round male members formed in the connecting surface of the basic bodies, which male members engage female-like engagement means in the underside of the cutting insert. However, in these cases, the female-like engagement means are only partly round seatings or seating surfaces, which are open laterally, and which therefore cannot absorb lateral displacement forces in arbitrary radial directions.

Furthermore, European Patent No. 1405686 discloses a cutting tool in the form of a turning tool, the cutting insert of which is detachably connected to a basic body via a tightening screw as well as via a cylindrical locking pin mounted in the basic body, which locking pin engages a cylindrical hole in the cutting insert, and has the capability of counteracting translation of the cutting insert in relation to the basic body. In practice, however, the screw lacks the capability of rotation-securing the cutting insert in a position in which the active cutting edge of the cutting insert reliably can retain an exact space position in relation to the basic body, since the screw, via the male thread thereof, has a certain play in relation to the female thread of the basic body, and may as well be deflected by the cutting forces. Furthermore, the engagement of the locking pin in the cylindrical hole requires extremely fine tolerances to prevent the cutting insert from moving in relation to the locking pin.

SUMMARY OF THE INVENTION

The present invention aims at overcoming the above-mentioned problems, by providing a cutting tool having an improved interface between the basic body of the tool and the individual cutting insert. Therefore, a primary object of the invention is to provide a tool having an interface that, on one hand, can fix the cutting insert stably in such a way that the active cutting edge of the cutting insert is reliably located in a correct, non-overdetermined position in relation to the basic body, and, on the other hand, can absorb considerable cutting forces in the area where the need for stability is the greatest, viz. in the immediate vicinity of the corner of the cutting insert that includes the active cutting edge. An additional object is to provide an interface that not only locates the cutting insert in the desired way initially in connection with the mounting, but also can retain the stable fixation of the cutting insert under the severe stresses that the cutting insert is subjected to during the chip removing machining. In addition to presenting an improved abutment for such forces that act in the direction from above and down into the cutting insert, the interface should prevent the cutting insert from becoming translated and rotated, respectively, in relation to the basic body. It is also an object to provide an interface that guarantees the desired properties in respect of the positional accuracy and capacity of transferring force, without the manufacture of the basic body and cutting insert of the tool being made more difficult or more expensive. In particular, the cutting insert should, if required, be possible to manufacture by direct pressing, i.e., without the need of expensive grinding operations.

In an embodiment, the invention provides a tool for chip removing machining, including a basic body and a cutting insert detachably connected to the basic body via an interface. A first connecting surface is included in the basic body in which one or more female- and/or male-like, primary engagement means are formed, and a second connecting surface is included in the cutting insert in which one or more secondary, male- and/or female-like engagement means are formed for engagement with the primary engagement means in the first connecting surface. The connecting surfaces of the cutting insert and basic body have a common geometrical reference locus. The cutting insert includes a corner having a cutting edge. A pair of co-operating, primary and secondary engagement means spaced apart from the reference locus includes flank surfaces which have a rotationally symmetrical basic shape, at least one of which has a tapering shape to jointly position the cutting insert in a point spaced apart from the reference locus and to prevent translation of the cutting insert in arbitrary force-action directions in the interface. The two connecting surfaces include engagement means which are separated from the pair of engagement means that prevent translation as well as separated from the reference locus, to counteract rotation of the cutting insert around the pair of engagement means that prevent translation.

In another embodiment, the invention provides a cutting insert of a tool for chip removing machining, including a connecting surface in which male- and/or female-like engagement means are formed. The cutting insert has a geometrical reference locus, in which a tightening force is applicable to the cutting insert, as well as a corner having a cutting edge. A first engagement means is spaced apart from the reference locus and has a flank surface having a rotationally symmetrical and tapering basic shape to position the cutting insert in relation to a point spaced apart from the reference locus and prevent translation of the cutting insert in arbitrary force-action directions in a plane parallel to the connecting surface. A second engagement means, spaced apart from the reference locus, is provided to counteract rotation of the cutting insert around the first engagement means.

The invention is based on the idea of fixing cutting inserts, in particular indexable cutting inserts having two or more active cutting edges, in all force-action directions by three simultaneously active effects, viz. a first locking, which prevents rectilinear displacement or translation of the cutting insert in the plane of the interface, a second locking, which rotation-secure the same, as well as a third locking in the form of a stable support of the same. Together, these co-operating effects may be said to provide a triple securing of the cutting insert. The displacement-preventive locking is provided by means of a (solitary) pair of engagement means, which most suitably are a converging knob formed on the underside of the cutting insert, and a diverging seating in the basic body. By the fact that the co-operating flank surfaces of the knob and seating are given a tapering and rotationally symmetrical shape, translation of the cutting insert in the interface is made impossible, no matter how attacking forces in this plane are radially directed in relation to the common center of the knob and seating. Furthermore, it is guaranteed that the knob finds its way centrically into the seating irrespective of possible form defects, whereby overdetermination of the position of the cutting insert is avoided. Rotational securing of the cutting insert is suitably—though not necessarily—provided by another pair of co-operating engagement means, e.g., a knob and a seating, which pair is spaced apart from not only the positioning and displacement-preventive knob, but also from the center axis or geometrical reference locus of the cutting insert. Finally, the stable support is provided by means of ample bearing surfaces, which advantageously may be the lower surfaces of the knobs. In practice, the invention is particularly suitable for indexable cutting inserts. In such cases, the cutting inserts are manufactured with two or more knobs, one or more of which, are not active for rotation- and translation-securing the cutting insert, and are utilized in order to, with the underside thereof, rest against a suitably planar support surface in the connecting surface of the basic body.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
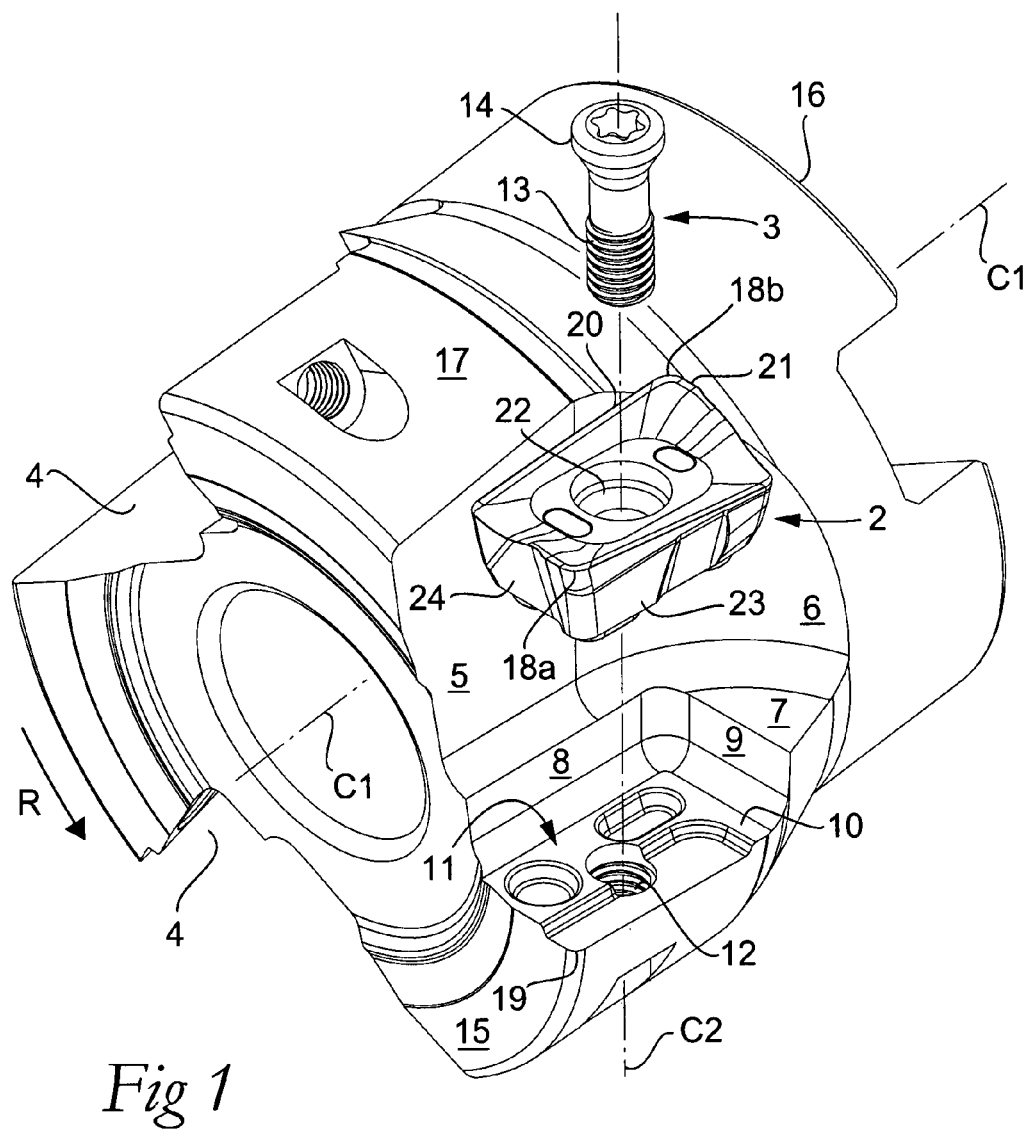
FIG. 1 is a perspective exploded view showing a cutting tool in the form of a milling cutter, a cutting insert and a tightening screw for the fixation of the same being shown spaced-apart from the basic body of the tool.

In FIG. 1, a tool for chip removing machining (cutting tool) is shown, which includes a basic body 1 and a cutting insert 2, that is fixable in the basic body by means of a tightening member 3, which, in this case, is in the form of a screw. In the example, the tool is rotatable and is a milling cutter, more precisely an end or face mill, which includes a plurality of chip pockets 4 in which equally many cutting inserts 2 can be mounted, only one of which is shown in FIG. 1. The basic body 1 is rotatable around a center axis designated C1.

In this case, the individual chip pocket 4 is delimited by a side surface 5, a concavely arched end surface 6, and a planar shoulder surface 7, which transforms into a countersink, which in turn is delimited by a side surface 8, an end surface 9, as well as a shoulder surface 10, which in this case is planar. Together with countersunk seatings and part surfaces, which will be described in detail below, the shoulder surface 10 is included in a first connecting surface, which generally is designated 11. In connecting surface 11, a hole 12 having a female thread mouths. The center axis of the hole is designated C2.

With continued reference to FIG. 1, the tightening screw 3 includes a male thread 13 and a head 14, which in this case is conical, but which also may have other shapes, e.g., flat.

In FIG. 1, a front end surface is designated 15, and 16 designates a limiting line for a rear end surface of the basic body 1, while 17 designates a rotationally symmetrical envelope surface. In operation, the milling cutter rotates in the direction of the arrow R.

In the example, the cutting insert 2 is indexable by including two cutting edges 18 adjacent to diametrically opposed corners of the cutting insert. Among the cutting edges, the cutting edge 18a identified by index "a" is active by being indexed forward into a position in the vicinity of the free corner 19 of the basic body that is formed where the end surface 15, the envelope surface 17 and the connecting surface 11 meet each other. However, in the shown position, the opposite cutting edge 18b is inactive.

Each individual cutting edge 18 includes a longitudinal, chip-removing main edge 20, as well as a transverse wiper edge 21 having the purpose of wiping off and leveling the surface generated during milling.

A central hole 22 is formed in the cutting insert. Also the center axis of this hole—as well as of the screw 3—is designated C2, since the centers of the two holes and of the screw coincide when the cutting insert is mounted in the basic body. In the example, the cutting insert is elongate and includes two long sides 23 and two short sides 24, which form clearance surfaces adjacent to the cutting edges.

Figure 3:
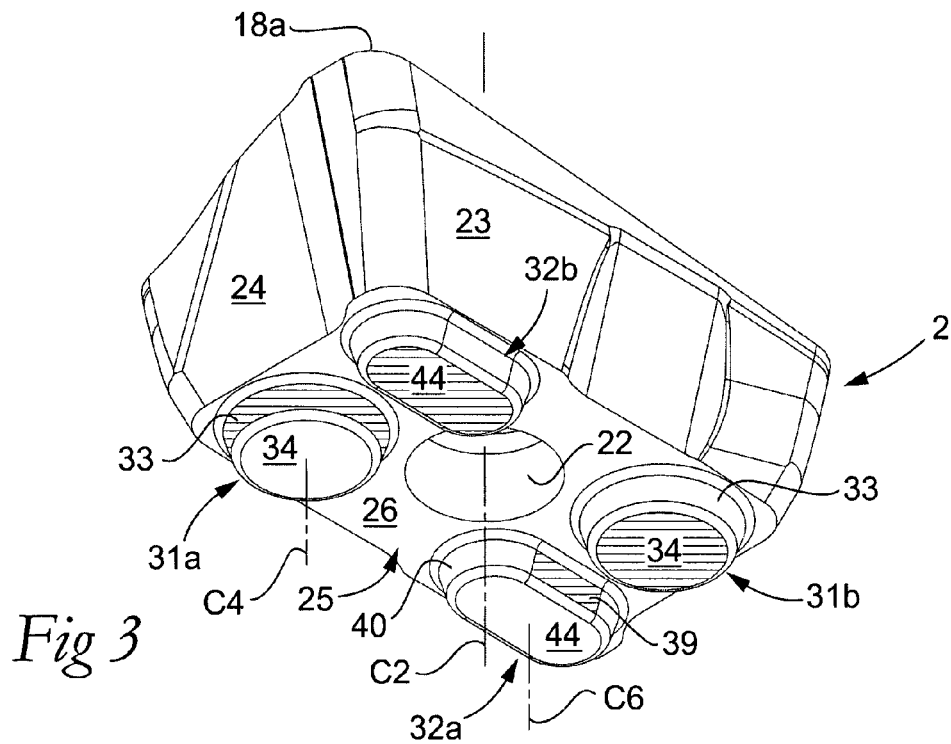
FIG. 3 is a bottom perspective view of the cutting insert, showing a second connecting surface included in the underside of the cutting insert.
Figure 2:
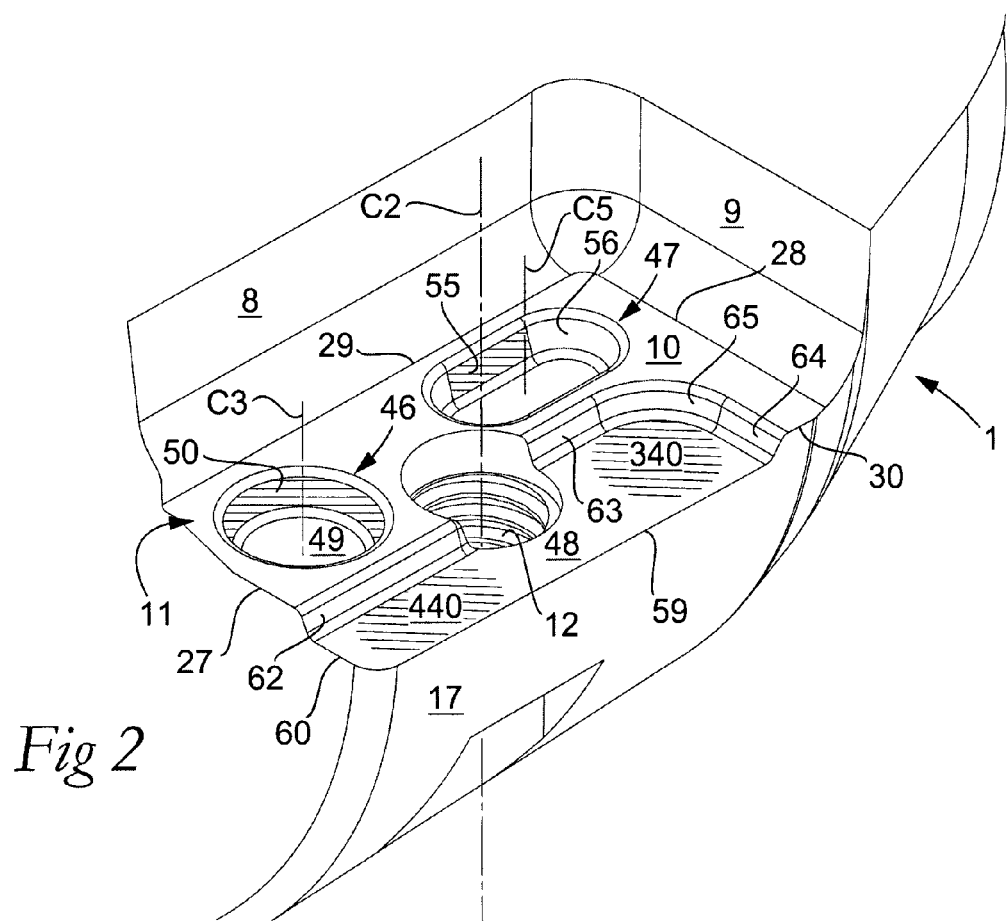
FIG. 2 is an enlarged top perspective view showing a first connecting surface included in the basic body.
Figure 4:
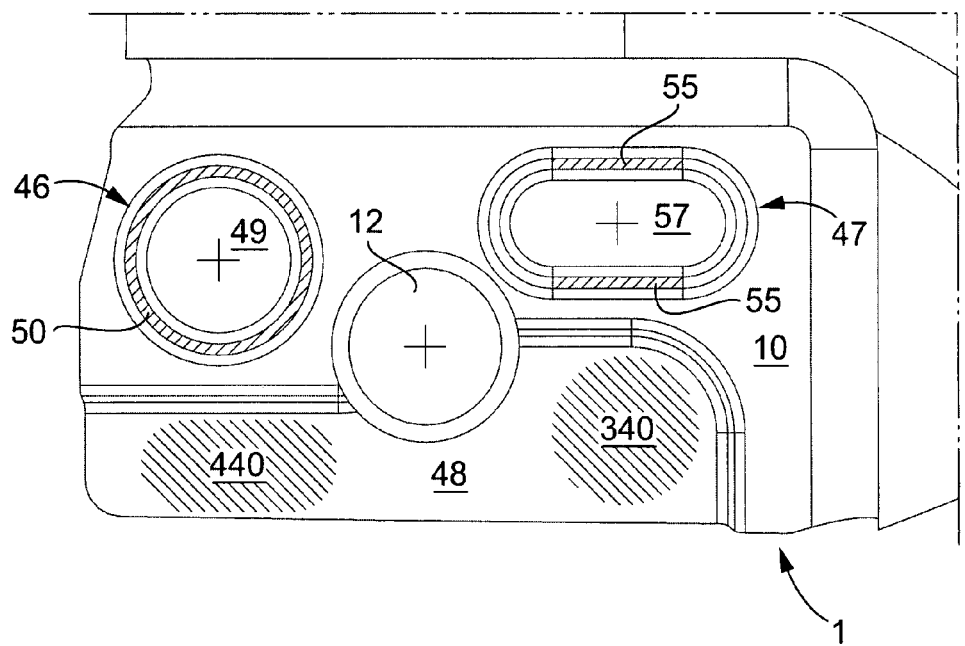
FIG. 4 is a plan view from above of the first connecting surface according to FIG. 2.

Reference is now made to FIGS. 2 and 3, which in more detail illustrate the formation of not only the first connecting surface 11 in the basic body 1, but also a co-operating, second connecting surface 25 on the underside of the cutting insert 2. In this case, a great part of the second connecting surface 25 is a planar surface 26, which forms the underside of the cutting insert.

The milling cutter, in the instant example, has a diameter of 40 mm (i.e., the radius, from the center axis C1 to the main edges 20 of the cutting inserts is 20 mm). The first connecting surface 11 has a length of 16.2 mm (=the distance between the front and rear borderlines 27, 28) and a width of 8.5 mm (=the distance between the inner and outer borderlines 29, 30). The second connecting surface 25 is approximately equally large as the first connecting surface.

In each of the connecting surfaces 11, 25, engagement means are formed, which may be either female-like or male-like, the engagement means co-operating in pairs in such a way that a male-like engagement means engages a female-like engagement means. In the example shown, all engagement means included in the connecting surface 25 on the underside of the cutting insert are male-like, and are constituted by knobs that project from the underside 26. Hence, it follows that the co-operating engagement means of the first connecting surface 11 are female-like, and constituted by seatings.

The number of knobs on the underside of the cutting insert in this case when the cutting insert is indexable, is four, one pair of knobs having an identical shape that differs from the shape of the knobs of the other pair. More precisely, two knobs 31a, 31b have a generally round, pulley-like shape, while the two other knobs 32a, 32b have an elongate shape. The round shape of the individual knob 31 (see also FIG. 6) is determined by an endless, peripheral flank or flank surface 33, which, in accordance with an embodiment of the invention, has a rotationally symmetrical shape, simultaneously as it tapers or converges toward the free end of the knob 31, which in this case is represented by a lower, circular surface 34, which advantageously may be planar. A center axis, which defines the rotationally symmetrical shape of the flank surface 33, is designated C4. A concave radius transition 35 is formed between the surface 33 and the underside 26 of the cutting insert, while the narrow portion of the surface 33, as determined by the circular, lower borderline 36, transforms into a ring-shaped, convex transition surface 37. The upper, circular borderline of the surface 33 is designated 38. In the example, the surface 33 is genuinely conical by being generated by a straight generatrix.

The other two knobs 32 have an elongate contour shape. More precisely, the contour shape (see also FIGS. 8 and 10) is determined by two inclined side-flank surfaces 39, which run parallel to each other and end in two semi-circular curved end surfaces 40. The two side-flank surfaces 39 are advantageously, though not necessarily, planar, and are delimited by upper and lower, straight borderlines 41, 42 as well as by end borderlines 43. The two end surfaces 40 are partially conical and converge in the downward direction. The underside of the individual knob 32 is planar and designated 44. Also in this case, a concave transition surface 45 is formed between the underside 26 of the cutting insert and the flank or circumferential surface of the knob 32 composed by the part surfaces 39, 40. A convex transition surface 45a is provided adjacent to the underside 44.

All knobs 31, 32 are integrated parts of the cutting insert 2, i.e., are included in one and the same solid cemented carbide body that is formed by pressing and sintering of a powder mass.

Furthermore, the two knobs 31 are identical, not only so far that they have the same mean diameter in the cone surfaces 33, but also the same height (counted as the axial distance between the underside 34 of the knob and the underside 26 of the cutting insert). Also the two elongate knobs 32 are identical in respect of the dimensions of the circumferential flank surface as well as in respect of the height. The two elongate knobs 32 do not necessarily need to have the same height as the round knobs 31, even if this is the case in the shown embodiment.

Figure 8:
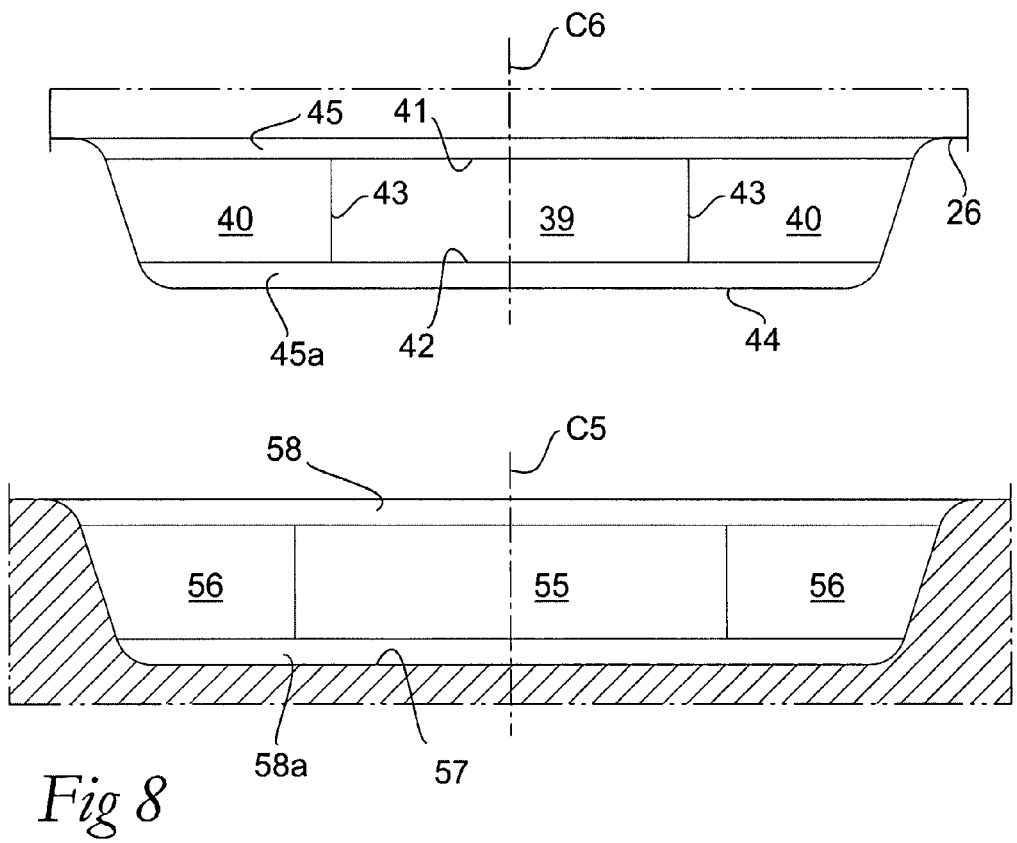
FIG. 8 is an enlarged exploded view showing an elongate knob and an elongate seating, which form another type of engagement means, the knob and the seating being shown alongside.

With reference to FIGS. 3 and 8, it should be pointed out that the individual, elongate knob 32 has a center axis that is perpendicularly to the underside 26 of the cutting insert and is designated C6.

In the connecting surface 11 of the basic body 1 (see FIG. 2), two seatings 46, 47 are formed, one of which is round and the other one elongate. In the exemplified embodiment, the connecting surface 11 is formed with two part surfaces, which are situated at different levels, and one of which is the shoulder surface 10, while the other one is a bottom surface designated 48, which is countersunk in relation to the shoulder surface 10 and forms a support surface for the cutting insert. In the example, the two part surfaces 10, 48 are planar, the planes thereof being mutually parallel. The seatings 46, 47 are countersunk in the shoulder surface 10.

The round seating 46 (see also FIG. 6) is delimited by a bottom 49 and an endless flank surface 50 having a rotationally symmetrical shape defined by a center axis C3. In the example, the flank surface 50 diverges in the direction from the bottom 49 to the mouth of the seating in the shoulder surface 10. More precisely, the flank surface 50—like the flank surface 33 of the knob 31—is conical by the fact that a lower, circular borderline 51 has a diameter that is somewhat smaller than the diameter of an upper, circular borderline 52. Between the flank surface 50 and the planar shoulder surface 10, a convexly rounded transition surface 53 is formed. Between the flank surface 50 and the bottom 49, there is a concavely rounded transition surface 54. The depth of the seating 46 is greater than the height of the knob 31, which means that the knob cannot touch the bottom of the seating.

Figure 9:
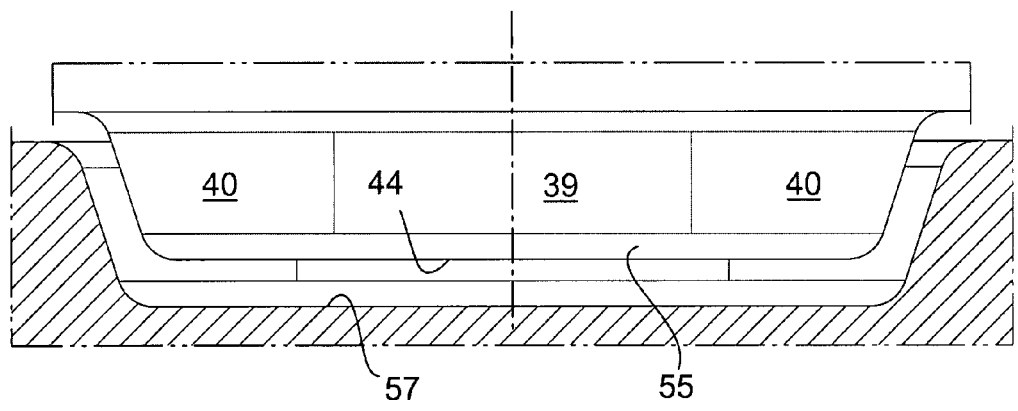
FIG. 9 is a section showing the knob and the seating according to FIG. 8 in engagement with each other.

The elongate contour shape of the seating 47 (see FIGS. 2, 4, 8 and 10) is analogous to the elongate contour shape of the knob 32. Thus, the seating 47 is delimited by two inclined side-flank surfaces 55, which are straight and suitably planar, as well as run parallel to each other. At opposite ends, the side-flank surfaces 55 transform into curved end surfaces 56, which, like the surfaces 40, have a semi-circular shape. In other respects, the seating 47 is delimited by a bottom surface 57 and two transition surfaces 58, 58a. The seating 47 is generally larger than the elongate knob 32, viz. so far that the same is longer than the knob. This has been accomplished by the fact that the internal side-flank surfaces 55 in the seating are somewhat longer than the co-operating, external side-flank surfaces 39 of the knob 32. On the other hand, the seating 47 has, in the main, the same width as the knob 32, so far that the width of the seating, counted as a mean distance between the side-flank surfaces 55 (see FIG. 10), is equally large as the width of the knob between the side-flank surfaces 39. Furthermore, the seating 47 has a depth, counted as the level difference between the bottom surface 57 of the seating and the shoulder surface 10, which is greater than the height of the knob 32. In other words, neither does the knob 32 bottom in the appurtenant seating 47. As a consequence of the seating 47 being somewhat longer than the knob 32, contact is obtained between the pairs of side-flank surfaces (see FIG. 11), but not between the curved end surfaces 40, 56 (see FIG. 9) when the knob engages the seating.

The contour shape of the support surface 48 (see FIG. 2) is determined, on one hand, by two straight, outer borderlines 59, 60 adjacent to the envelope surface 17 and the end surface 15, respectively, of the basic body, and on the other hand, by two interior limiting surfaces 62, 63, which extend axially, the rear surface 63 transforming into an end limiting surface 64 via a curved transition surface 65. In an area between the limiting surfaces 62, 63, the threaded hole 12 intersects the support surface 48 and separates the surfaces 62, 63. The front part of the support surface 48, which extends between the borderline 59 and the limiting surface 62, is narrower than the rear part that extends between the borderline 59 and the limiting surface 63, i.e., the limiting surface 62 is situated closer to the borderline 59 than the surface 63.

In FIGS. 2 and 3, shaded surface fields illustrate the surfaces of the knobs of the cutting insert which contact co-operating surfaces in the connecting surface of the basic body, when the two connecting surfaces engage each other. Thus, the conical flank surface 33 of the knob 31a contacts the likewise conical flank surface 50 in the seating 46. Furthermore, the planar side-flank surfaces 39 of the elongate knob 32a contact the side-flank surfaces 55 of the seating 47, however without the round end surfaces 40 contacting the round end surfaces 56 in the seating 47 (see also FIG. 9). This means that the elongate knob 32a can "move" in the longitudinal direction in the seating 47, viz. so far that if the cutting insert gets minor form defects in the manufacture, the side-flank surfaces 39 of the knob may assume different positions along the side-flank surfaces 55 of the seating. If the cutting insert, for instance, has swollen so that the distance between the center axes C4, C6 of the knobs 31a, 32a has become greater than the desired nominal measure, the knob 32a will in its entirety be located somewhat nearer the rear end of the seating than the front end thereof (upon possible shrinkage, the opposite relation applies). In this connection, possible dimensional variations in the manufacture of the cutting insert are on the order of ±0.5% of the nominal measures of the cutting insert. Thus, if the distance between the center axes C4, C6 of the knobs 31a, 32a is, for instance, 10 mm, possible dimensional deviations may be 0.05 mm.

As outlined by means of the shaded surface fields 340 and 440 in FIG. 2, the lower bearing surfaces 34, 44 of the knobs 31b and 32b abut against the support surface 48. In this state, the flank surfaces of the knobs 31b, 32b lack contact with the limiting surfaces 62, 63, 64, 65 that surround the support surface 48. In other words, the knobs 31b, 32b are free to assume different positions along the support surface 48 independently of possible form defects of the cutting insert.

When the cutting insert is fixed in the basic body by the screw 3 being tightened by a predetermined torque and the described interface becoming active, the knob 31a and the seating 46 together fulfill the purpose of translation-securing the cutting insert, i.e., preventing the cutting insert from being translated in the plane of the interface. Because of the co-operating flank surfaces of the knob 31a and seating 46 being rotationally symmetrical, this effect is guaranteed irrespective of the radial direction in which, in relation to the center axes C3, C4, the cutting insert is affected by external forces. Furthermore, the conical shape of the knob and seating guarantees an automatic centering of the knob along the center axis C3, the center axis C3 forming a fixed point around which the cutting insert is positioned.

The second, elongate knob 32a has, together with the seating 47, the purpose of preventing rotation of the cutting insert around the hypothetical center of rotation, which is constituted by the center axes C3, C4 of the knob 31a and seating 46. This takes place by the contact between the side-flank surfaces 39 of the knob 32a and the corresponding flank surfaces 55 of the seating 47. Because the knob 32a, in this state, is clamped or wedged in the seating 47 in a stable, immovable state, the rotational securing of the cutting insert becomes very reliable. Forces that aim to rotate the cutting insert around the center axes C3, C4 are principally absorbed by one of the flank surfaces 55 depending on whether the forces act counter-clockwise or clockwise around the center of rotation.

In the fixed state of the cutting insert, the two outer knobs 31b, 32b, positioned closest to the envelope surface 17, abut with the lower bearing surfaces 34, 44 thereof against the support surface 48 of the basic body (see the surface fields 340, 440 in FIG. 2). Because the bearing surfaces 34, 44 being ample, i.e., having a relatively large area, the interface obtains a good capacity of absorbing considerable forces that act from above and down through the cutting insert. This contrasts with the interfaces of previously known cutting tools, which without exception solely have relied on line contact or moderate surface contact between inclined flank surfaces.

Figure 6:
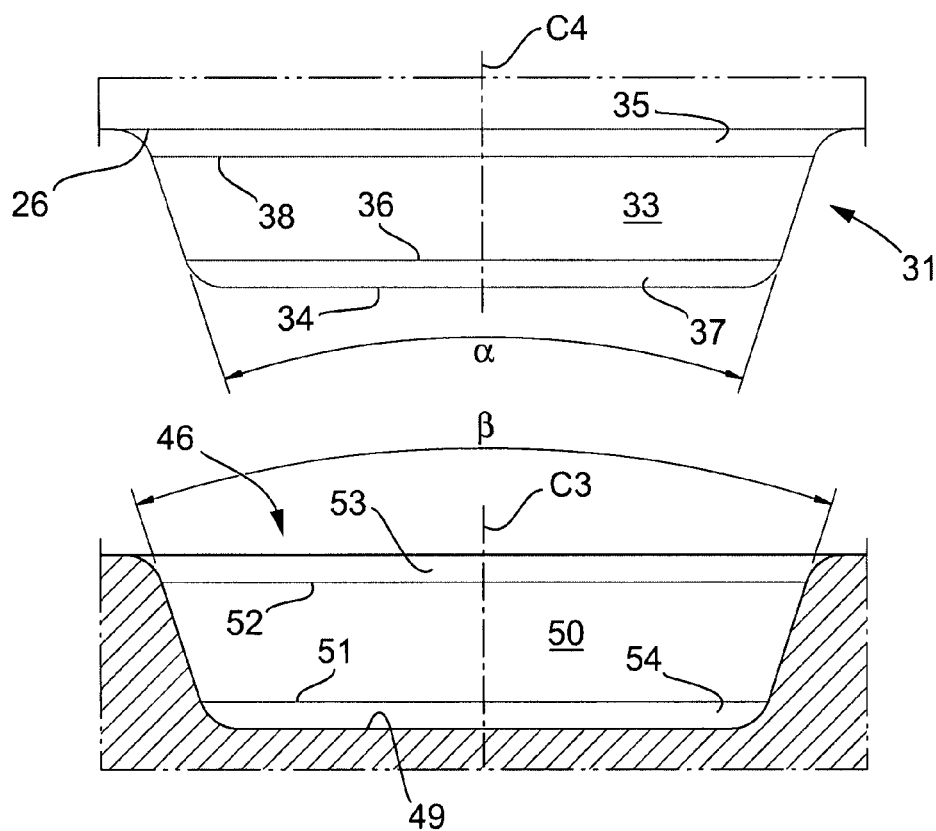
FIG. 6 is an enlarged exploded view showing a round knob and a round seating that form engagement means in the connecting surfaces.

In a preferred embodiment of the invention, the cone angles $\alpha$ and $\beta$, respectively, shown in FIG. 6, of the flank surface 33 of the knob 31 and the flank surface 50 of the seating 46 are differently large, more precisely in such a way that the cone angle $\alpha$ of the knob is somewhat larger than the cone angle $\beta$ of the seating. In the example shown, the angle $\alpha$ is 36.5°, while the angle $\beta$ is 36.0°, i.e., an angular difference of 0.5°. The effect of this angular difference is that line contact between the flank surfaces 33, 50 first is obtained in the area of the upper borderlines 38, 52, when the knob is pressed into the seating, and then a surface contact is established, which propagates downward as the seating 46 is subjected to coining. Initially, a circumferential clearance of 0.25° (the angular difference 0.5°/2) arises downward from the contact line. However, since the angular difference is utmost small, only a moderate coining of the seating is required in order to provide a surface contact between the surfaces 33,50 that extends downward from the contact line. By the fact that contact with certainty is established highest up in the seating, in all events the most stable possible engagement between the knob and the seating is guaranteed.

Figure 10:
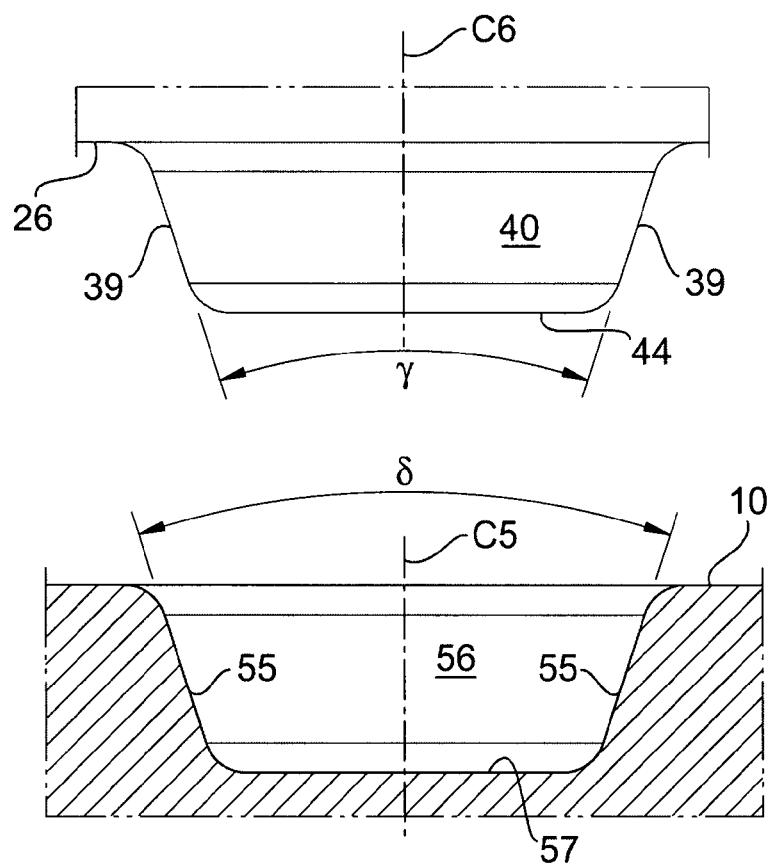
FIG. 10 is an exploded view corresponding to FIG. 8 showing the cross-section shape of the knob and seating.
Figure 11:
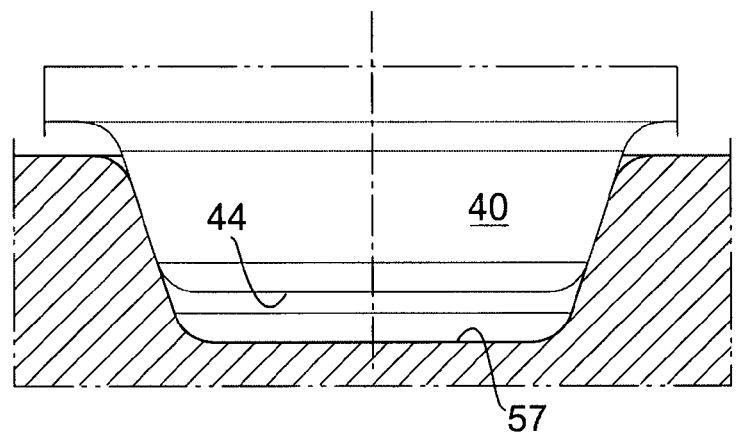
FIG. 11 is a cross section showing the knob and the seating according to FIG. 10 in engagement with each other.

With reference to FIG. 10, a corresponding angular difference also may exist between the flank surfaces 39 of the elongate knob 32 and the flank surfaces 55 of the seating 47. Thus, the angle $\gamma$ may be one or a few minutes larger than the angle $\delta$.

In this connection, it should be pointed out that the angles $\alpha$, $\beta$ as well as the angles $\gamma$, $\delta$, may be larger as well as smaller than approximately 36°. Thus in practice, the angles $\alpha$ and $\beta$ may vary roughly within the range of 20° to 65°. In other words, the knob is rather acutely tapered. Such a shape is possible since the bearing surfaces 34, 44 offer a good abutment against the support surface 48.

Figure 5:
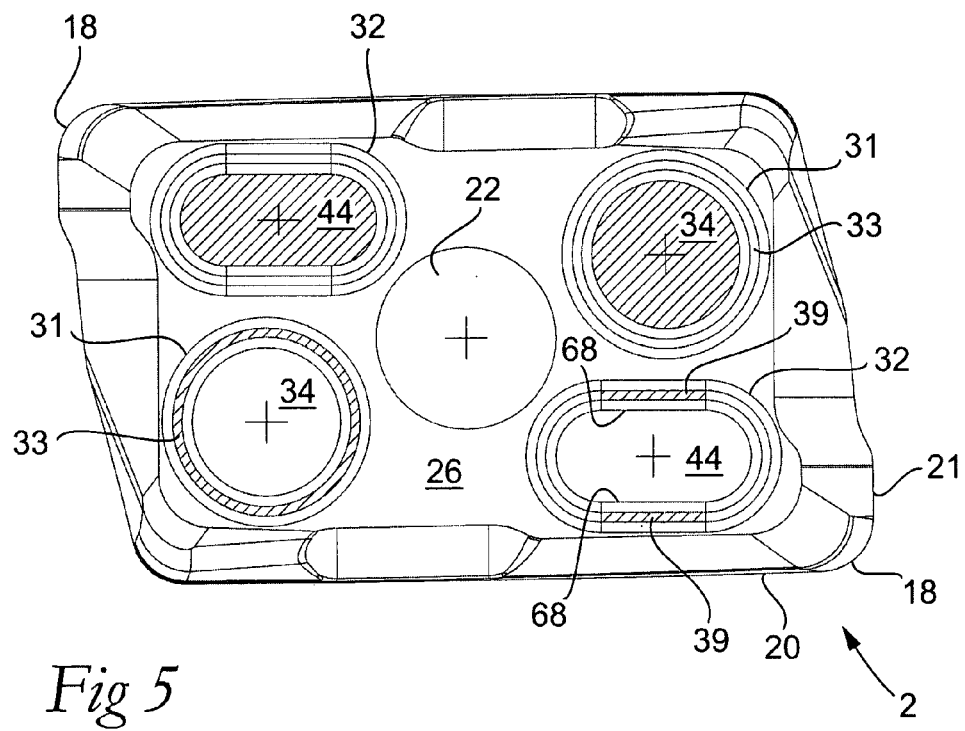
FIG. 5 is a plan view from below of the second connecting surface according to FIG. 3.

Among the two knobs 31a, 32b situated closest to the active cutting edge 18a, the most nearest one, viz. the knob 32b, has an elongate contour shape. This means that also the bearing surface 44 has an elongate shape. More precisely, the bearing surface is delimited by two straight, longitudinal borderlines 68 (see FIG. 5), one of which is, in the main, parallel to and positioned near the main edge 20 of the cutting edge 18. Therefore, in practice, the severely loaded main-edge portion obtains a good support also when the milling cutter operates at great cutting depths.

Figure 7:
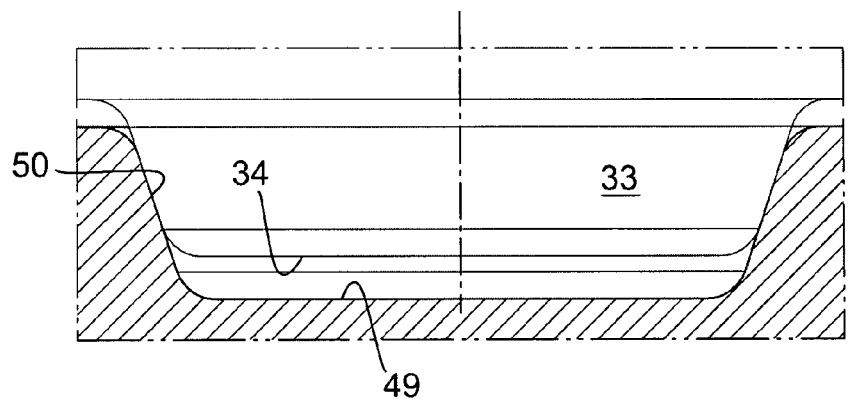
FIG. 7 is a section showing the knob in engagement with the seating.
Figure 13:
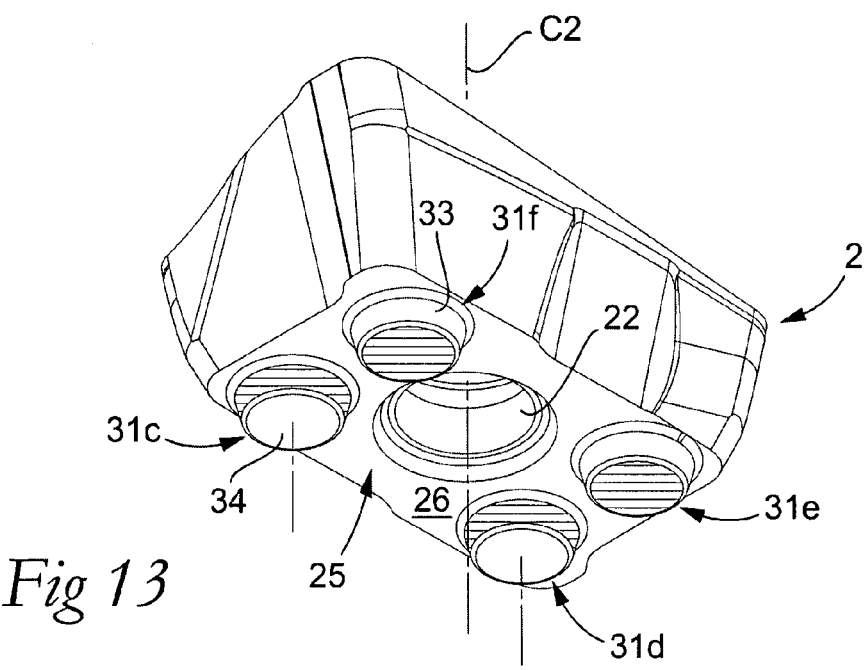
FIG. 13 is a bottom perspective view showing the second connecting surface of the same interface.
Figure 12:
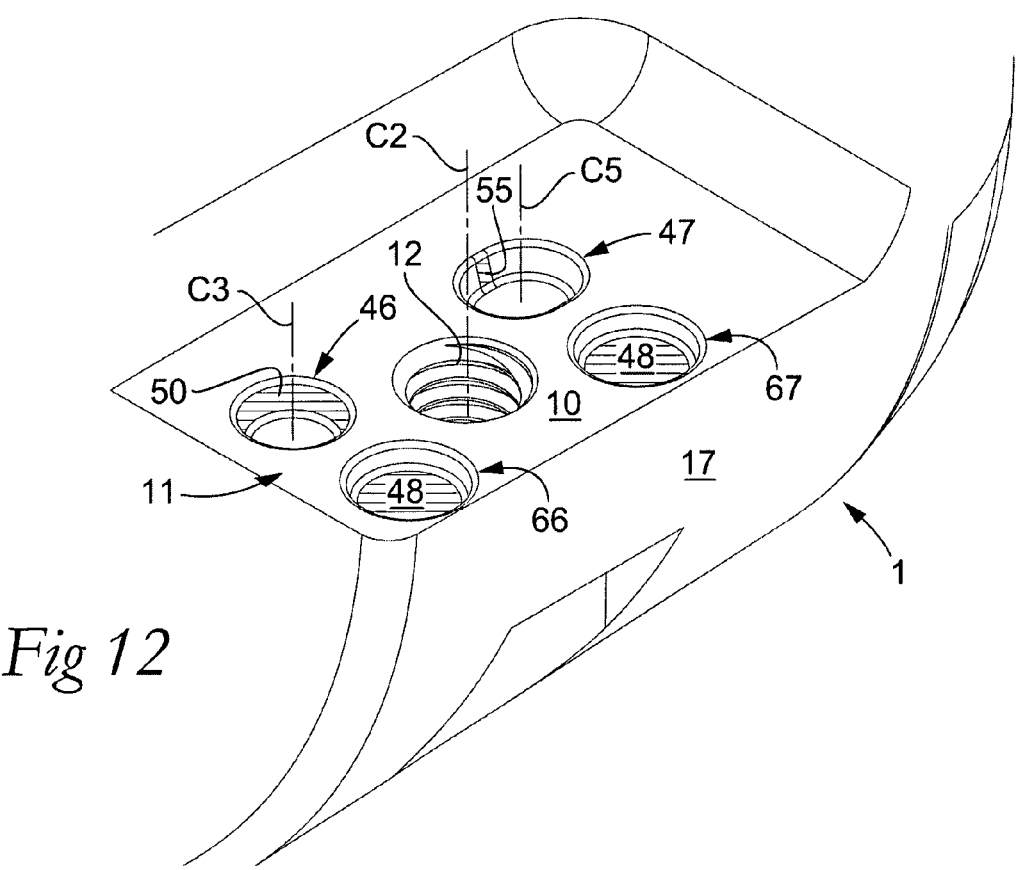
FIG. 12 is a top perspective view corresponding to FIG. 2 showing a first connecting surface included in an alternative embodiment of the interface according to the invention.

Reference is now made to FIGS. 12 and 13, which illustrate an alternative embodiment of the invention. In this embodiment also, the connecting surface 25 of the cutting insert 2 includes four knobs 31, which project downward from the underside 26 of the cutting insert. However, in this case, all knobs are round and identical, and advantageously formed in the general way described above in connection with FIGS. 6 and 7. In order to distinguish the knobs in respect of their positions and functions, the same have, however, been provided with the suffixes c, d, e and f. Each individual knob 31 has a conical flank surface 33 and a lower bearing surface 34.

In this case, the connecting surface 11 formed in the basic body 1 includes a single planar surface 10 in which four seatings 46, 47, 66, 67 are countersunk. Among these, the seatings 46, 47 are analogous to the corresponding seatings of the embodiment according to FIGS. 2 and 3, viz. so far that the envelope surface 50 of the seating 46 is conical and has the same diameter as the flank surface 33 of the individual knob 31, and that the seating 47 has an elongate, i.e., non-rotationally symmetrical shape. Furthermore, the seatings 46, 47 have a depth that is greater than the height of the knobs 31 in order for the knobs not to touch the bottom of the same. However, in the embodiment shown in FIG. 12, the elongate seating 47 is considerably shorter than the corresponding elongate seating in FIG. 2, because the two, suitably planar side-flank surfaces 55 are very short in comparison with the total width of the seating. In this connection, the width of the seating, such as this is determined by the distance between the two side-flank surfaces 55 of the seating (only one of which is visible in FIG. 12), corresponds with the diameter of the individual knob 31. In other words, the knob generally obtains line contact with the side-flank surfaces 55.

The two other seatings 66, 67 in the connecting surface 11 may advantageously be identical. Characteristic of the seatings 66, 67 is that they are shallower than the seatings 46, 47 and have a greater diameter than at least the seating 50. More precisely, the depth of the seatings 66, 67 is adapted in such a way that the bearing surface 34 of the individual knob can be pressed against bottom support surfaces 48 in the seatings without the underside 26 of the cutting insert 2 contacting the surface 10. Furthermore, the fact that the seatings 66, 67 are wider than the seating 46 means that the flank surfaces 33 of the two knobs 31e, 31f housed in the same do not contact the flank surfaces 50 of the seatings.

The function of the interface shown in FIGS. 12 and 13 is as follows. When the two connecting surfaces have been brought to engagement with each other and fix the cutting insert, the knob 31c engaging the seating 46 guarantees that the cutting insert is positioned in a fixed locus or point determined by the center axis of the seating, and is not translated in the plane of the interface. Simultaneously, the knob 31d rotation-secures the cutting insert by the fact that the flank surface thereof is in line contact with the side-flank surfaces 55 of the seating 47. Furthermore, the support surfaces 48 of the seatings 66, 67 absorb the forces acting axially (along the axis C2) down through the cutting insert.

In this context, an advantage common to the two embodiments is, viz. that the requisite tightening force from a tightening element (irrespective of whether this is a screw, a clamp or the like) can be applied vertically down through the cutting insert because co-operating flank surfaces have a conical or tapering shape. This means, for instance, that a screw does not need to be biased, but can apply the tightening force thereof unidirectionally along the center axis C2. This ensures that the tightening force, in particular if the screw has a flat head, will become considerable. Simultaneously, the screw obtains a long service life. Furthermore, the generally tapering shape of the knobs and seatings entails the advantage that the cutting insert automatically seeks the correct position, when it is let down into the connecting surface of the basic body.

A stable anchorage of a cutting insert implies that the position of the cutting insert is not what is denominated "overdetermined" by those skilled in the art. This concept is most simply understood by a comparison between, for instance, three-legged and four-legged pieces of furniture. A three-legged piece of furniture is always stable irrespective of the length of the legs. However, a four-legged piece of furniture is dependent on all legs having exactly the same length, because if any of the legs would have a length that deviates from the length of the other legs, one of the legs will lack contact with the ground.

A fundamental advantage of the interface according to the invention is that the cutting insert can be triple-secured (prevented from being translated, prevented from being rotated, and prevented from sinking down) without risking overdetermination of the position of the cutting insert. All in all, the cutting insert is fixed in a reliable and stable way.

Figure 15:
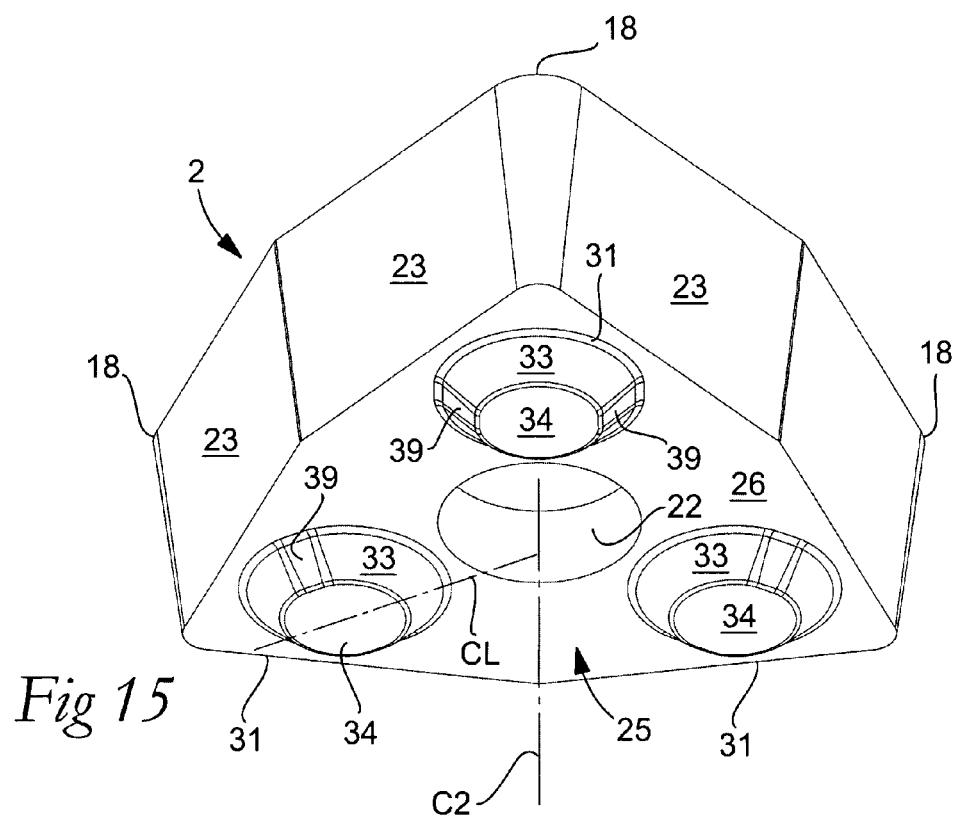
FIG. 15 is a bottom perspective view of the second connecting surface of the same interface.
Figure 14:
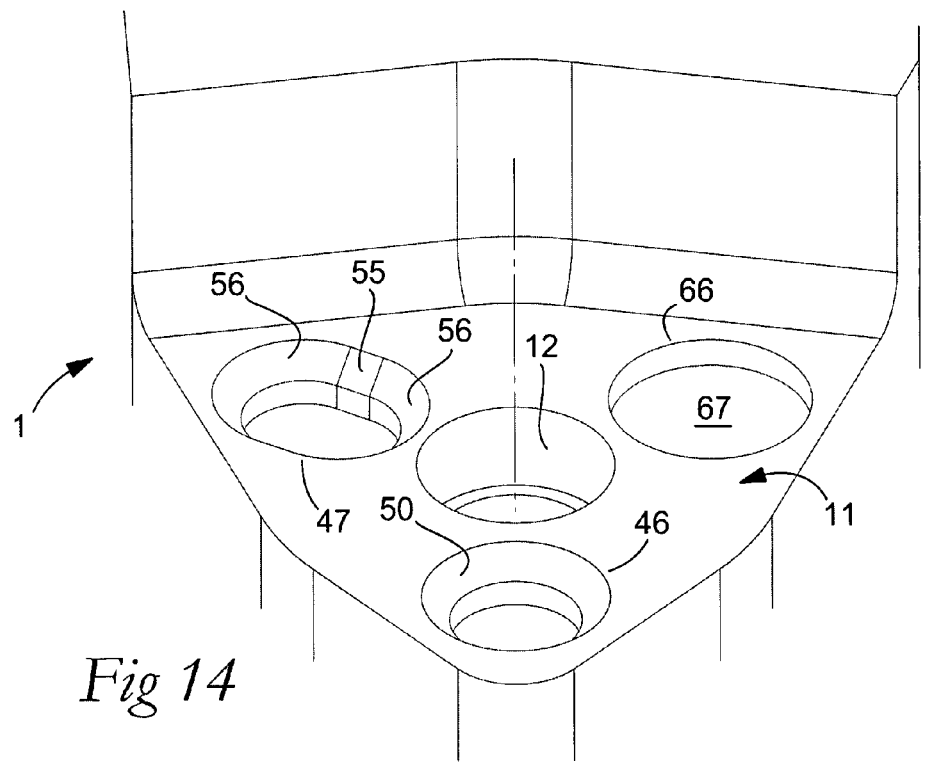
FIG. 14 is a top perspective view of a first connecting surface of another alternative embodiment of the interface of the invention.

Now, reference is made to FIGS. 14 and 15 which disclose a further alternative interface according to the invention. In this case the invention is applied to a turning tool using a triangular cutting insert 2 which includes three cutting edges 18 at three corners and is indexable into three different positions in the basic body 1.

The connecting surface 25 of the cutting insert 2 is provided with no more and no less than three engagement means in the form of knobs 31, which are equidistantly spaced apart not only from each other, but also from a geometrical reference locus constituted by the center axis C2 of a central through hole 22. Each knob 31 includes a conical flank surface 33 ending from a planar bearing surface 34. Two planar side surfaces 39 are recessed in diametrically opposed positions on the knob and run parallel with each other and with an imaginary center line CL. Preferably, this center line CL extends radially from the center axis C2 of the cutting insert, as shown in FIG. 15. The individual knob 31 is located in the vicinity of one of the three corners of the cutting insert. The center line CL forms a bisector between two clearance surfaces 23 meeting at a corner.

The connecting surface 11 of the basic body 1 includes three different seatings 46, 47, 66, the first seating 46 including a conical flank surface 50 for co-operation with the conical flank surface 33 of a knob. A second seating 47 is generally elongate and includes two opposite (rather short) planar side surfaces 55 transforming into two semi-circular end surfaces which-taper conically.

The third seating 66 is, in this case, of a circular shape. The important features of the seating 66 are, one hand, that it is wider than the knob 31, and, on the other hand, that it is more shallow than the other seatings 46, 47, i.e. the bottom surface 67 thereof is located on a level above the bottom surfaces of the seatings 46, 47.

As in previous embodiments, one of the knobs 31, viz the knob that engages the seating 46, prevents the cutting insert from being translated, while the knob that engages the seating 47 prevents the same from being rotated. At the same time the third knob supports the cutting insert against the bottom surface 67 of the third seating 66.

In the embodiment of FIGS. 14 and 15, the cone angles of the flank surfaces 33 and 50 may vary within the range of approximately 80° to 110°.

An advantage of the embodiment shown in FIGS. 14 and 15 is that the cutting insert is indexable into more than two positions, viz three positions, meaning that three operable cutting edges can be provided. Furthermore, only one knob is supported with its lower bearing surface against a co-operating support surface in the basic body. This means that the risk of over-determination of the cutting insert is further decreased.

Figure 17:
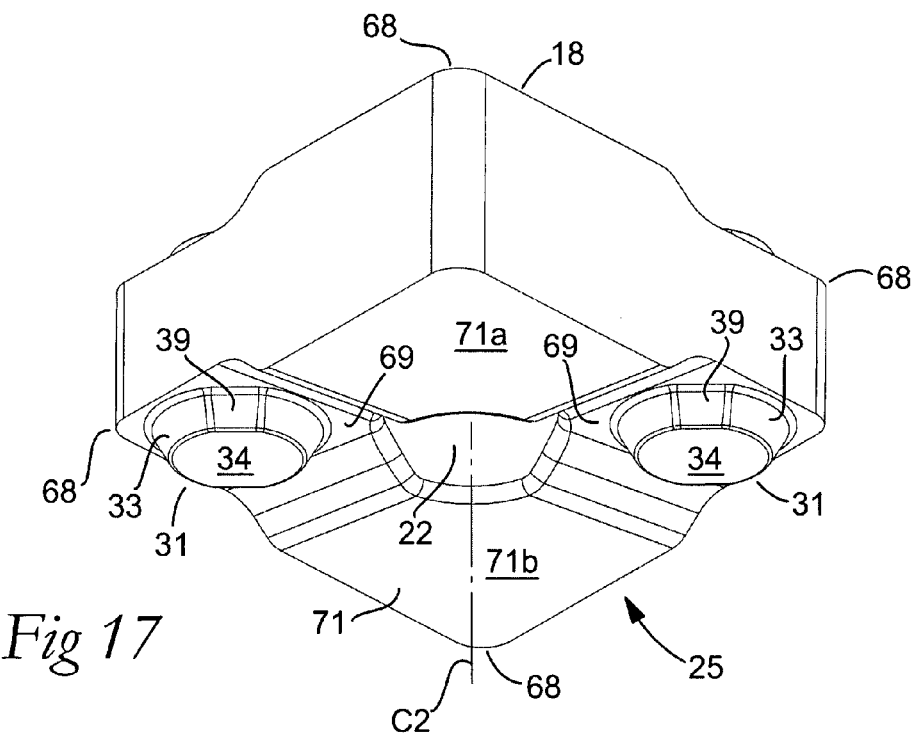
FIG. 17 is a bottom perspective view of a second connecting surface included in a cutting insert to be fixed in the first connecting surface.
Figure 16:
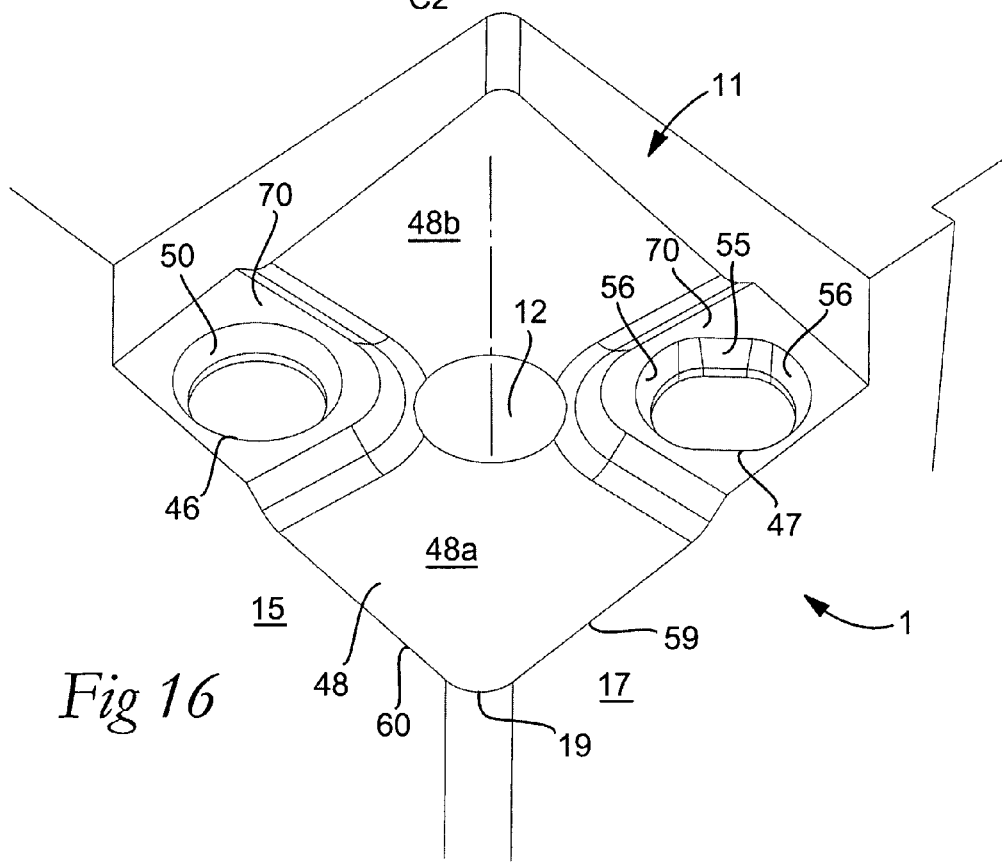
FIG. 16 is a top perspective view of a first connecting surface of another interface.
Figure 18:
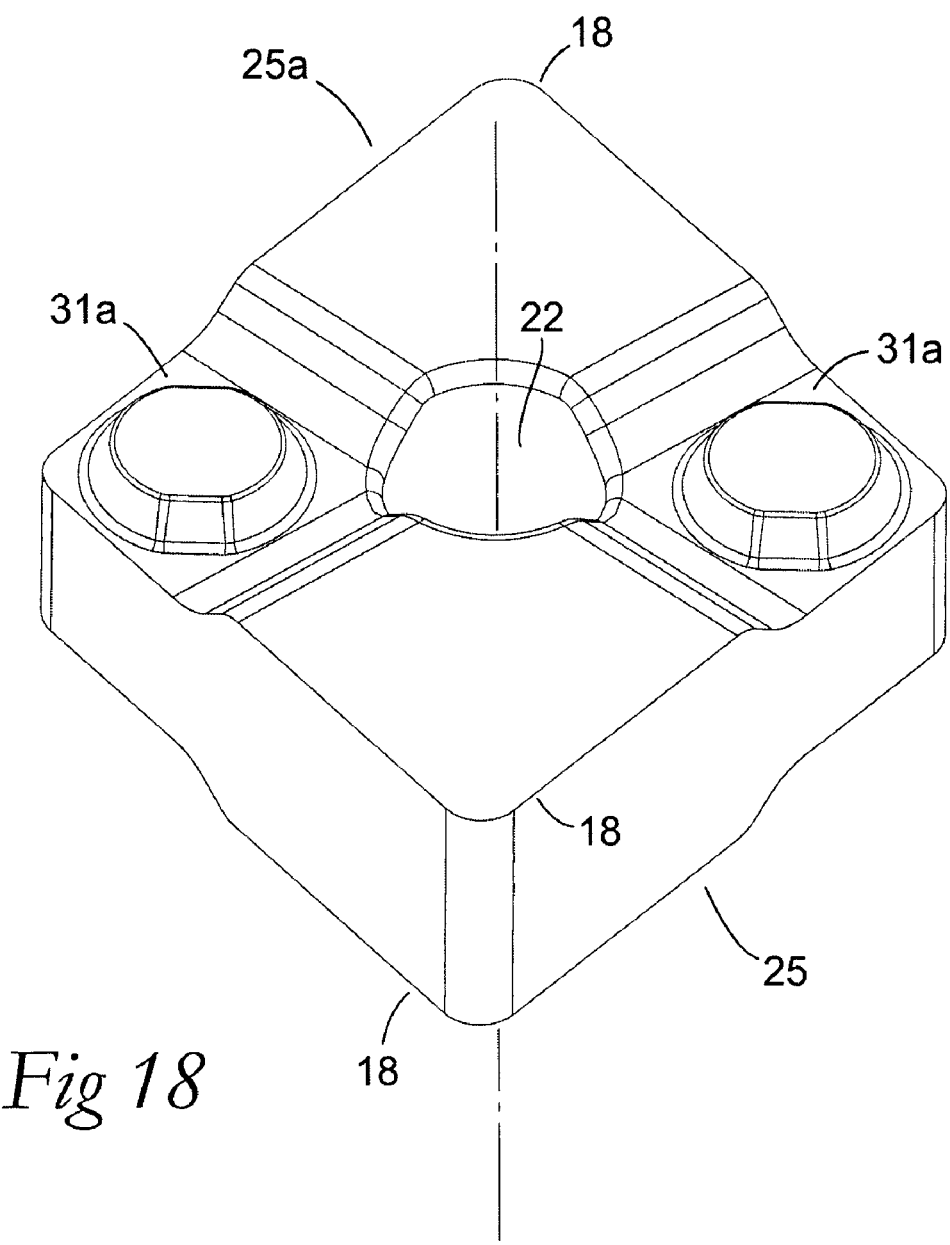
FIG. 18 is a top perspective view of the insert of FIG. 17.

Yet another embodiment of the invention is shown in FIGS. 16-18. In this case, a connecting surface 25 of the cutting insert 2 is provided with no more and no less than two engagement means in the form of identical knobs 31 having conical flank surfaces 33 in which a pair of planar surfaces 39 are recessed. A free end of each knob is a planar bearing surface 34. The knobs 31 are equidistantly spaced apart from the center axis C2 of the insert and also equiangulary separated, i.e. the angle therebetween is 180°. The cone angle of the flank surface 33 may be rather acute and vary in the range of approximately 20° to 65°, each surface 39 being rather short.

In this case the basic shape of the cutting insert is that of a quadrangle, thus forming four corners 68. Each knob 31 projects from a surrounding part surface 69, which is countersunk in relation to a bearing surface 71 including two part surfaces 71a, 71b that are spaced apart by a central through hole 22. The knobs 31 are located in the vicinity of two diametrically opposed corners 68, while the two parts surfaces 71a, 71b extend inwardly from the other two corners 68.

In practice it is possible to design the cutting insert with only one connecting surface 25 (in the underside), meaning that two cutting edges 18 can be included. As shown in FIG. 18, it is, however, also possible to make the cutting insert turnable by adding a second, identical connecting surface 25a in the opposite side thereof. In this way, four usable cutting edges 18 are included. If the insert is made turnable as in FIG. 18, peripheral portions of the part surfaces 71a, 71b are formed as chip-breaking (concave) surfaces.

The connecting surface 11 of the basic body 1 (see FIG. 16) includes two primary engagement means in the form of seatings 46, 47, of which seating 46 includes a conical flank surface 50, and seating 47 is oblong by including two planar side surfaces 55 and two part-conical or semi-circular end surfaces 56. In the embodiment shown, the seatings 46, 47 are formed in two spaced-apart lands 70 between which a lower support surface 48 extends, the surface 48 including two part surfaces 48a, 48b which are spaced apart by a central hole 12 and the lands 70. The forward part surface 48a connecting to the corner 19 is delimited between, on one hand, the lands 70, and, on the other hand, the border lines 59, 60 of surfaces 17, 15 meeting at the corner 19. Also in this case the cone angles of the flank surfaces 33 and 50 may be within a range of approximately 20° to 50°. The cutting insert 2 of the tool shown in FIGS. 16-18 is intended to be fixed by a screw (not shown), the male thread of which co-operates with a female thread (not visible) in the hole 12. In this case, the two part surfaces 48a, 48b may very well be leveled with each other, i.e. be located in a common plane. It is, however also possible, and sometimes preferable, to fix the insert by clamping. In such a case the part surfaces 48a, 48b may be located at different levels, more specifically with surface 48*a* located somewhat higher than surface 48*b*, the clamp acting on the forward portion of the insert so as to urge the bearing part surface 71*a* against the supporting part surface 48*a*, but leaving a thin gap between surfaces 71*b* and 48*b*.

The invention is not solely limited to the embodiments described above and shown in the drawings. Thus, it is feasible to modify the two connecting surfaces of the interface, for instance, in such a way that one or more knobs are formed in the connecting surface of the basic body for the co-operation with one or more seatings in the cutting insert. The connecting surface of the cutting insert could be formed with seatings only for the co-operation with knobs in the connecting surface of the basic body. Such an embodiment would be particularly suitable for turnable cutting inserts, i.e., cutting inserts having identical connecting surfaces on opposite sides (as in FIGS. 16-18). Furthermore, the engagement means for rotation-securing the cutting insert may be formed in other ways than in the form of an individual knob and an individual seating. For instance, the two connecting surfaces could be formed with co-operating male- and female-like engagement means having a keyhole-like contour shape. In doing so, the male element may have a generally elongate shape and, in one end thereof, have a flank in the form of a conical part surface, and at the opposite end thereof two planar side-flank surfaces, the partially conical male flank surface co-operating with a conical female flank surface in a continuous countersink, which at the end thereof spaced apart from the conical flank surface has two female-like planar side-flank surfaces against which the planar male side-flank surfaces can be pressed. Indexable cutting inserts are of course formed with two such, keyhole-like male elements for the co-operation with at least one female-like countersink having a similar contour shape.

In some disclosed embodiments of circular, conical knobs, the flank surface is endless and smooth, at the same time as the female flank surface in the co-operating seating is also smooth and endless. However, within the scope of the invention, it is also feasible to vary the design of at least one of the flank surfaces. In particular, the flank surface on the knob could be made with a number of peripherally spaced-apart countersinks, which form clearance surfaces between a number of partially conical part surfaces, which form proper contact surfaces against the female flank surface. Furthermore, it is feasible to impart another tapering shape than just genuinely conical to at least one of the flank surfaces. Thus, it is feasible to form the male flank surface with a convexly arched shape defined by a slightly arched generatrix instead of a straight one. The male flank surface may also be broken, i.e., generated by a broken generatrix.

The concept "basic body," as used herein, should be interpreted in a wide sense. In the above examples, the basic body, in which the first connecting surface of the interface is formed, is in the form of a tool holder (in the form of a milling cutter in FIGS. 1-13). Within the scope of the invention, the connecting surface may also be formed in an attachment, e.g., a shim plate or the like, which, in turn, is fixed in a tool holder in a suitable way. The concept "cutting insert" should also be interpreted in a wide sense and generally be regarded to include all types of replaceable wear parts that have the capability of executing chip removing machining of, particularly, metallic work pieces. Concerning the design of the engagement means in other respects, it should be pointed out that per se, it is preferred to make the bearing surface of a knob, as well as the co-operating support surface in the first connecting surface, in the form of planar surfaces. However, this does not exclude that at least one of the two co-operating bearing and support surfaces is given another shape, e.g., a slightly convex shape. Neither does the bearing surface of the knob need to extend along the entire underside of the knob. Thus, the bearing surface could be formed in the form of a ring-shaped surface having a reduced area. The invention is applicable to all cutting inserts having corners, irrespective of the number of corners. Thus, the invention is applicable even to simple cutting inserts having only one corner and one cutting edge. It is also conceivable to apply the teaching of the invention to round cutting inserts having just one, endless cutting edge.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising: a basic body and a cutting insert detachably connected to the basic body via an interface, a first connecting surface included in the basic body in which one or more female- and/or male-like, primary engagement means are formed, and a second connecting surface included in the cutting insert in which one or more secondary, male- and/or female-like engagement means are formed for engagement with the primary engagement means in the first connecting surface, the connecting surfaces of the cutting insert and basic body having a common geometrical reference locus, the cutting insert including a corner having a cutting edge, wherein a pair of co-operating, primary and secondary engagement means spaced apart from the reference locus comprises flank surfaces which have a rotationally symmetrical basic shape, at least one of which has a tapering shape to jointly position the cutting insert in a point spaced apart from the reference locus and to prevent translation of the cutting insert in arbitrary force-action directions in the interface, and wherein the two connecting surfaces include engagement means which are separated from the pair of engagement means that prevent translation as well as separated from the reference locus, to counteract rotation of the cutting insert around the pair of engagement means that prevent translation.

2. The tool according to claim 1, wherein the primary engagement means of the pair of co-operating engagement means that prevent translation of the cutting insert, is a seating, a flank surface of which diverges in a direction from a bottom toward a mouth, while the secondary engagement means is a knob, a flank surface of which converges in a direction from an underside of the cutting insert toward a free end.

3. The tool according to claim 1, wherein at least one of the flank surfaces is endless such that the flank surface is smooth and lacks interruptions.

4. The tool according to claim 2, wherein both flank surfaces are at least partially conical, the flank surface of the knob having a cone angle that is larger than a cone angle of the flank surface of the seating.

5. The tool according to claim 1, wherein the engagement means that counteract rotation are a seating and a knob, a flank surface of which converges in a direction from the underside of the cutting insert toward a free end.

6. The tool according to claim 5, wherein the knob as well as the seating of the engagement means that counteracts rotation has an elongate contour shape.

7. The tool according to claim 5, wherein the seating of the engagement means that counteracts rotation is longer than the knob of the engagement means that counteracts rotation.

8. The tool according to claim 6, wherein the contour shape of the knob and the seating is determined by straight side-flank surfaces, which run parallel to each other and end in semi-circular end surfaces.

9. The tool according to claim 1, the cutting insert being indexable by including at least two cutting edges adjacent to respective corners, wherein the second connecting surface of the cutting insert includes two identical, translation-securing secondary engagement means, which are spaced-apart from each other and from the reference locus, one of which is in active engagement with the primary engagement means in the first connecting surface of the basic body.

10. The tool according to claim 9, wherein the two identical, translation-securing secondary engagement means are knobs, and the primary engagement means is a seating.

11. The tool according to claim 10, wherein the cutting insert includes two mutually identical knobs to counteract rotation of the cutting insert.

12. The tool according to claim 10, wherein the free end of at least one knob forms a bearing surface, which is pressable against a support surface in the second connecting surface of the basic body.

13. The tool according to claim 12, wherein the support surface in the second connecting surface of the basic body is a bottom of the corresponding seating, which is wider than the at least one knob.

14. The tool according to claim 10, wherein the first connecting surface of the basic body includes two part surfaces, which are situated at different levels, a lowest positioned part surface forming a support surface, at least one seating being countersunk in the highest situated part surface.

15. The tool according to claim 12, wherein the knob which is situated nearer a cutting edge than an adjacent knob, has an elongate contour shape and an elongate bearing surface.

16. The tool according to claim 15, wherein a length extension of the elongate bearing surface is substantially parallel to a chip-removing main edge of the cutting edge.

17. The tool according to claim 10, wherein the cutting insert has an elongate basic shape by including two long sides and two short sides, and wherein the cutting insert includes four knobs, one translation-securing knob and one rotation-securing knob which are situated in the vicinity of a first long side, while the two other knobs are situated in the vicinity of the opposite long side.

18. The tool according to claim 14, wherein the level difference between the two part surfaces is smaller than a depth of the at least one seating.

19. The tool according to claim 9, wherein the second connecting surface of the cutting insert includes four identical, round knobs, and wherein the first connecting surface of the basic body includes four seatings, two of which are wider and shallower than a seating for a translation-preventing knob.

20. The tool according to claim 1, wherein the first connecting surface in the basic body includes two primary engagement means and the second connecting surface of the cutting insert includes two identical secondary engagement means which are equidistantly spaced apart from the geometrical reference locus and equiangularly spaced apart from each other.

21. The tool according to claim 20, wherein the two primary engagement means are seatings and the two secondary engagement means are knobs, the flank surfaces of which are conical and formed with pairs of opposed planar side surfaces running parallel to each other, a first one of the two seatings being formed with a conical flank surface, while the second one is oblong by being confined by two opposite planar side surfaces as well as two part-conical end surfaces.

22. The tool according to claim 21, wherein the seatings are recessed in two spaced-apart lands between which a lower support surface extends.

23. The tool according to claim 22, wherein the support surface includes two part surfaces, one of which is delimited between the lands and two border lines meeting at a corner between two external surfaces of the basic body.

24. The tool according to claim 23, wherein a cone angle of the knobs is in a range of 20° to 65°.

25. The tool according to claim 1, wherein the first connecting surface of the basic body includes three primary engagement means and the second connecting surface of the cutting insert includes three identical secondary engagement means, which are equidistantly spaced apart from the geometrical reference locus and from each other.

26. The tool according to claim 25, wherein the primary engagement means are seatings, while the secondary engagement means are knobs, the flank surfaces of which converge in a direction from an underside of the cutting insert toward free ends of the knobs and are formed with pairs of opposed planar side surfaces running parallel with each other.

27. The tool according to claim 26, wherein an imaginary center line between the side surfaces of each knob extends radially from the geometrical reference locus.

28. The tool according to claim 26, wherein a first one of the three seatings is provided with a conical flank surface, a second one of the three seatings is oblong by being confined by two opposite planar side surfaces as well as two semi-circular end surfaces, and a third one of the three seatings being wider than the knobs and more shallow than the first and the second seatings.

29. The tool according to claim 25, wherein a cone angle of the flank surface of the knobs is in the range of 80° to 110°.

30. The tool according to claim 1, wherein the geometrical reference locus is defined by a center axis of a central through hole in the cutting insert and a threaded hole in the basic body.

31. A cutting insert of a tool for chip removing machining, comprising: a connecting surface in which male- and/or female-like engagement means are formed, the cutting insert having a geometrical reference locus, in which a tightening force is applicable to the cutting insert, as well as a corner having a cutting edge, wherein a first engagement means is spaced apart from the reference locus and has a flank surface having a rotationally symmetrical and tapering basic shape to position the cutting insert in relation to a point spaced apart from the reference locus and prevent translation of the cutting insert in arbitrary force-action directions in a plane parallel to the connecting surface, and wherein a second engagement means, spaced apart from the reference locus, is provided to counteract rotation of the cutting insert around the first engagement means.

32. The cutting insert according to claim 31, wherein the respective engagement means are knobs, the flank surfaces of which converge in a direction from an underside of the cutting insert toward a free end of the respective knobs.

33. The cutting insert according to claim 31, wherein the flank surface is endless such that it is smooth and lacks interruption.

34. The cutting insert according to claim 31, wherein the flank surface is conical.

35. The cutting insert according to claim 32, wherein the knob of the second engagement means has an elongate contour shape.

36. The cutting insert according to claim 35, wherein the elongate contour shape of the knob is determined by two side-flank surfaces, which run parallel to each other, and end in two semi-circular end surfaces.

37. The cutting insert according to claim 32, wherein the respective free ends of the knobs form respective bearing surfaces for the cutting insert.

38. The cutting insert according to claim 37, wherein the bearing surfaces are planar.

39. The cutting insert according to claim 31, being indexable by including at least two cutting edges adjacent to respective corners, wherein the connecting surface includes two identical first engagement means having rotationally symmetrical flank surfaces, which are equidistantly spaced-apart from the reference locus of the cutting insert and two identical second engagement means, which are equidistantly spaced-apart from the reference locus.

40. The cutting insert according to claim 39, wherein at least one pair of identical engagement means are knobs.

41. The cutting insert according to claim 39, wherein the one of two adjacent knobs situated closest to a corner of a cutting edge has an elongate contour shape and thereby an elongate bearing surface.

42. The cutting insert according to claim 41, wherein a length extension of the bearing surface is substantially parallel to a chip-removing main edge of the cutting edge.

43. The cutting insert according to claim 40, the cutting insert having an elongate contour shape by including two long sides and two short sides, wherein the connecting surface is formed with four knobs, a translation-securing knob and a rotation-securing knob being situated in the vicinity of a first long side, while the two other knobs are situated in the vicinity of the opposite long side.

44. The cutting insert according to claim 32, wherein the translation-securing knob has a mean diameter that is greater than a height of the knob as determined by a distance between the free end of the knob and the underside of the cutting insert.

45. The cutting insert according to claim 31, wherein the connecting surface includes four identical, round knobs.

46. The cutting insert according to claim 31, wherein the connecting surface is provided with two identical secondary engagement means which are equidistantly spaced apart from the geometrical reference locus and equiangularly spaced apart from each other.

47. The cutting insert according to claim 46, wherein the secondary engagement means are knobs, the flank surfaces of which are conical and formed with pairs of opposed planar side surfaces running parallel to each other.

48. The cutting insert according to claim 47, wherein the knobs project from surrounding part surfaces which are countersunk in a bearing surface.

49. The cutting insert according to claim 48, the basic shape of which is a quadrangle, wherein the two knobs are located in the vicinity of two diametrically opposed corners thereof, and two part surfaces of the bearing surface extending inwardly from the other two corners.

50. The cutting insert according to claim 46, including two identical connecting surfaces on opposed upper and lower sides thereof.

51. The cutting insert according to claim 32, wherein a cone angle of the first engagement means is in a range of 20° to 50°.

52. The cutting insert according to claim 31, wherein the connecting surface is provided with three identical engagement means, which are equidistantly spaced apart from the geometrical reference locus and from each other.

53. The cutting insert according to claim 52, wherein each engagement means is a knob having a conical flank surface in which a pair of opposed planar side surfaces are recessed, the side surfaces running parallel with each other.

54. The cutting insert according to claim 53, wherein an imaginary center line between the side surfaces of each knob extends radially from the geometrical reference locus.

55. The cutting insert according to claim 53, wherein a cone angle of the flank surface of each knob is in the range of 80° to 110°.

56. The cutting insert according to claim 31, wherein the geometrical reference locus is defined by the center axis of a central through hole.

* * * * *